United States Patent [19]
Loseke

[11] Patent Number: 5,997,394
[45] Date of Patent: Dec. 7, 1999

[54] LEAF LARD REMOVER

[75] Inventor: Terry O. Loseke, North Platte, Nebr.

[73] Assignee: Jarvis Products Corporation, Middletown, Conn.

[21] Appl. No.: 09/271,464

[22] Filed: Mar. 18, 1999

[51] Int. Cl.[6] .................................................. A22C 17/16
[52] U.S. Cl. .......................................... 452/134; 452/130
[58] Field of Search .................................... 452/134, 125, 452/129, 130, 128, 132

[56] References Cited

U.S. PATENT DOCUMENTS

| | | | |
|---|---|---|---|
| 4,021,883 | 5/1977 | Schmidt, Jr. | 452/128 |
| 4,351,088 | 9/1982 | Leining et al. | 452/129 |
| 4,433,453 | 2/1984 | Leining et al. | 452/130 |
| 4,631,780 | 12/1986 | Leining et al. | 452/130 |
| 4,727,623 | 3/1988 | Durand . | |
| 4,776,063 | 10/1988 | Tieleman | 452/134 |
| 4,901,398 | 2/1990 | Durand . | |
| 4,993,112 | 2/1991 | Burnett et al. . | |
| 5,129,856 | 7/1992 | Hahn et al. . | |
| 5,785,588 | 7/1998 | Jacobs et al. . | |

FOREIGN PATENT DOCUMENTS 1065704  4/1967  United Kingdom .

*Primary Examiner*—Willis Little
*Attorney, Agent, or Firm*—DeLio & Peterson, LLC

[57] ABSTRACT

A tool for removing leaf lard from a carcass includes a head for mechanically engaging the lard, a reversible driver for rotating the head in a forward direction and in a reverse direction, a trigger connected to operate the reversible driver and begin rotation of the head in the forward direction to wind lard onto the head, and a controller connected to the trigger, the controller automatically reversing the driver and rotating the head in the reverse direction to unwind lard from the head after the trigger is released. The head preferably includes multiple hooks arranged to engage the lard and positioned on the head to an avoid damage to adjacent meat.

20 Claims, 3 Drawing Sheets

LEAF LARD REMOVER

BACKGROUND OF THE INVENTION

1. Field of the Invention

The present invention relates to tools for removing lard from carcasses during meat processing.

2. Description of Related Art

One step required in the processing of hog carcasses is the removal of lard or fat which is found in two strips along the inner surfaces of the carcass halves. These strips are often referred to as the "leaf lard" due to their leaf-like shape in which the lard starts with a relatively narrow width near the lower end of a carcass suspended by its hind legs.

The leaf lard is typically removed by loosening the lower edge of the lard, then pulling it upwards—which causes it to peel away from the inner side of the carcass. A tool for use with this method is shown in U.S. Pat. No. 5,129,856 which describes a tool that grips the lard, coupled with a vertical piston assembly that provides an upward force to peel the lard away from the carcass.

One difficulty with this process is that it becomes progressively more difficult to pull the leaf lard away from the carcass as the width of the leaf lard increases. This will occasionally cause the relatively narrow starting end of the leaf lard to rupture as the force required to peel the leaf lard increases.

A solution to this problem is shown in U.S. Pat. No. 5,785,588 which uses an automatically positioned lard remover with a rotary driven head to wind the lard onto the head. The winding action prevents the lard from being torn at the starting point and provides a progressively better grip as the lard is wound onto the head. A problem with this tool, however, is that the lard must be removed from the tool by sliding or pulling it off the end of the winding head, or by manually unwinding it from the head.

Removal of the wound up lard from the end of the tool by pulling it off the head causes several problems. A particular difficulty is that this removal method limits the shape of the head. The head must be relatively smooth and shaped to allow the lard to slide off. This conflicts with the requirement that the head adhere to the lard in order to wind it onto the head. The tool described in this patent uses vacuum to adhere the lard to a relatively smooth head. This requires a separate vacuum system and a vacuum line running to the head which increases the cost and complexity of the tool and which limits its maneuverability in a non-automated setting.

In automatic processing, pulling the lard off requires that the tool be repositioned to elements that grab the lard to pull it from the end of the head. This takes time which can slow the processing operation. Manually unwinding the lard from the head after it has stopped takes even longer and is not suitable for modern processing operations.

Bearing in mind the problems and deficiencies of the prior art, it is therefore an object of the present invention to provide a leaf lard remover tool that winds the lard onto a head, then automatically removes the lard by unwinding.

It is another object of the present invention to provide a leaf lard remover tool that can be positioned by hand to accommodate different size carcasses.

A further object of the invention is to provide a leaf lard remover tool that does not require a vacuum system to adhere the lard to the head.

Yet another object of the invention is to provide a leaf lard remover tool that does not damage the carcass or backbone area when the tool is used.

Still other objects and advantages of the invention will in part be obvious and will in part be apparent from the specification.

SUMMARY OF THE INVENTION

The above and other objects, which will be apparent to those skilled in art, are achieved in the present invention which is directed to a leaf lard remover tool that includes a head adapted to engage lard, a reversible driver for rotating the head in a forward direction and in a reverse direction, a trigger connected to operate the reversible driver and begin rotation of the head in the forward direction to wind lard onto the head, and a controller connected to the trigger, the controller automatically reversing the driver and rotating the head in the reverse direction to unwind lard from the head after the trigger is released.

In the disclosed design, the trigger provides a control signal to the controller and the controller operates the reversible driver to rotate the head in the forward direction when the trigger is actuated and to rotate the head in the reverse direction for a fixed period of time after the trigger is released, sufficient to unwind the lard. In this embodiment of the invention, the trigger is biased towards an off position and must be held by an operator in an on position. The controller continuously rotates the head in the forward direction while the trigger is held in the on position and the controller then automatically reverses the driver and rotates the head in the reverse direction for a fixed period of time after the trigger is released.

In the preferred design, the trigger is mounted on a handle and is manually operated. In the most highly preferred embodiment, there are two triggers mounted on two handles. The second trigger is also biased towards an off position and must be held by an operator in an on position. The controller is connected to the first and second triggers and controls the driver to rotate the head in the forward direction only when both triggers are held on.

The reversible driver preferably comprises a hydraulically operated reversible motor. The hydraulic motor is reversed by a steering valve controlled by the controller. The steering valve is connected to first and second hydraulic lines that lead to the motor and to a source of pressurized hydraulic fluid. The controller controls the steering valve to send pressurized hydraulic fluid to the reversible driver through the first hydraulic line to operate the motor in the forward direction and to send pressurized hydraulic fluid to the reversible driver through the second hydraulic line to operate the motor in the reverse direction.

In another aspect of the invention, the leaf lard remover tool further includes a right angle gear system connected between the reversible driver and the head which allows the head to be easily positioned against the lard by an operator.

The head of the leaf lard remover tool includes a relatively simple, yet effective design which allows the head to engage the lard when the head is rotated in one direction and to release the lard when the head is rotated in the opposite direction. No vacuum or automated clamps are needed. The head includes a plurality of hooks that hook into and engage the lard when placed adjacent to it while the head is rotating in the forward direction. The shape and direction of the sharp end of the hooks is such that the hooks release the lard when the head is rotated in the reverse direction.

The hooks are preferably provided on one or more disks, each disk including one or more of the hooks. In this design, the hook disks are separated by spacers without hooks. To prevent the hooks from damaging valuable non-lard portions of the carcass as they are rotated, the head is arranged such that the hooks extend only over a limited portion of the head. The head also includes a tip portion that does not have any hooks, the hooks being limited to a central portion of the head. The tip portion of the head preferably has a smaller diameter than the central portion of the head and is provided with a notched surface. The notched surface acts to provide a good grip on any lard that is wound on that section, but does not damage the valuable portions of the carcass prior to any lard being wound thereon.

The head is reversible so that the tool may be used on either side of the carcass to remove the lard without damaging adjacent areas of meat.

BRIEF DESCRIPTION OF THE DRAWINGS

The features of the invention believed to be novel and the elements characteristic of the invention are set forth with particularity in the appended claims. The figures are for illustration purposes only and are not drawn to scale. the invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–3 of the drawings in which like numerals refer to like features of the invention.

Figure 1:
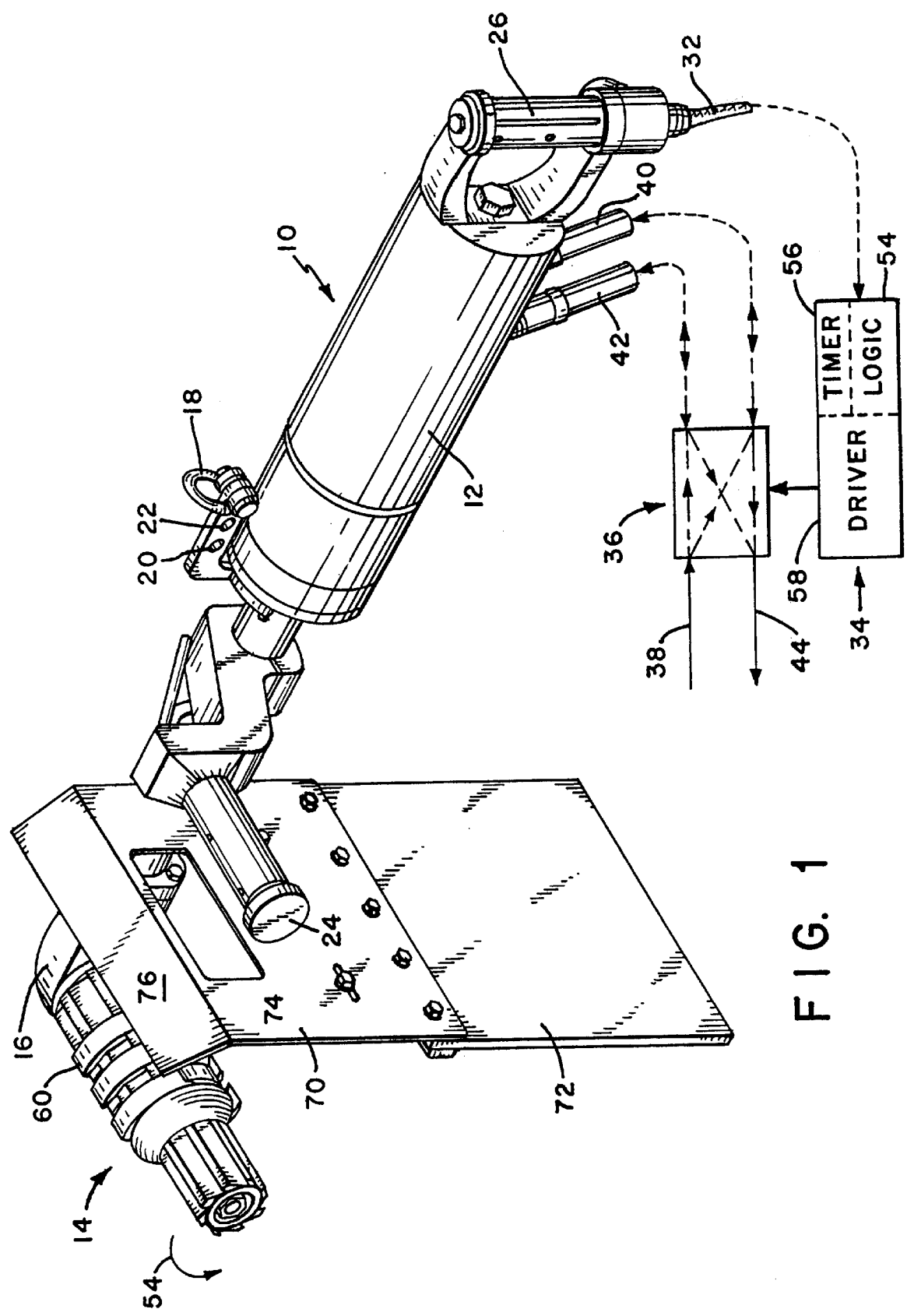
FIG. 1 is a perspective view of a preferred embodiment of the leaf lard remover tool of the present invention, with hydraulic valves and piping and controller circuitry being shown in block diagram form.

Referring to FIG. 1, the leaf lard remover tool of the present invention includes a body 10 incorporating a reversible driver 12. The driver 12 preferably comprises a reversible hydraulic motor which operates a winding head 14 through a right angle gear unit 16. The leaf lard is wound onto head 14 when the motor turns in one direction and reversing the motor causes the leaf lard to be unwound so that it can drop into a collection bin.

The weight of the tool is preferably suspended from suspension point 18 which may be moved to adjust the balance by repositioning in holes 20, 22. The tool is manipulated manually and positioned by grasping handles 24 and 26. The front handle 24 is provided with a spring-loaded trigger 28 and the rear handle 26 is provided with a spring-loaded trigger 30 (see FIG. 3). Triggers 28 and 30 are preferably wired in series and are connected via control cable 32 (which extends out the bottom of handle 26) to control unit 34.

Control unit 34 is preferably an electronic circuit which controls a three position electrically operated hydraulic valve 36. The three positions of the valve include an off position (in which the motor is off), a forward position (in which the motor spins the head 14 to wind lard thereon) and a reverse position (in which the motor reverses to unwind the lard from the head). The arrows inside the block diagram valve 36 of FIG. 1 show the flow directions of pressurized fluid and exhaust fluid through the valve.

When the tool is at rest, with either trigger 28 or 30 in the off position, the three position hydraulic valve 36 will be in the off position and will prevent any hydraulic fluid flow to the driver 12. After both triggers 28 and 30 are actuated, the three position hydraulic valve 36 will shift, under control of the controller 34, to the forward position and will connect pressurized hydraulic fluid arriving over hydraulic line 38 to the first hydraulic line 40. The forward position also connects the second hydraulic line 42 to the exhaust line 44.

The forward position of the valve 36 allows pressurized fluid to flow from the source hydraulic line 38 through hydraulic line 40 to run the hydraulic motor of driver 12 in the forward direction and wind lard on the head 12. The hydraulic fluid then exhausts through the second hydraulic line 42 and out through the hydraulic valve 36 and exhaust line 44.

When the motor begins to rotate in the forward direction it drives elongated shaft 46 (see FIG. 3) which turns pinion gear 48 in the right angle head 16. The pinion gear 48 drives crown gear 50 which turns square shaft 52 to rotate head 14 in the forward direction indicated by arrow 54.

Controller 34 includes a logic section 54, a timer section 56 and a driver section 58. The logic section determines when the two switches 28, 30 have been simultaneously depressed in order to actuate the driver and begin forward rotation of head 14. In the preferred design, the switches 28 and 30 are wired in series. Pressing both switches makes a connection which is sensed by logic circuitry 54. The logic circuitry operates the driver circuitry 58 to shift the three position valve 36 into the forward flow position described previously.

Forward rotation of the head 14 causes hooks 60 on hook disks 62 (see FIG. 3) to engage the leaf lard when the head 14 is pressed into contact therewith. The hooks 60 grab the leaf lard and begin to wind it onto the head 14. This action continues as long as the operator has the triggers 28 and 30 pressed in to the on position. The triggers 28, 30 are provided with corresponding springs 66, 68 which bias them towards the off position.

The tool operator must hold the triggers in until the leaf lard has been completely removed from the carcass and wound onto the head 14. By requiring that the two separate triggers be actuated and by positioning the two handles with the triggers away from the head, the tool ensures that the operator's hands are clear of the head before it begins to rotate.

Once the leaf lard has been removed from the carcass, the operator releases either or both of the triggers. This release is sensed by logic circuitry 54. Logic circuitry 54 then automatically signals the driver circuit 58 to switch the hydraulic valve 36 to the reverse position. The logic circuit always goes to the reverse mode after the forward mode for a predetermined length of time set by timer circuit 56, and this switching action is automatic.

In the reverse position the valve 36 sends pressurized hydraulic fluid from line 38 to the second hydraulic line 42. In this position, the motor of driver unit 12 reverses rotation and begins to spin the head 14 in the opposite direction which unwinds the lard, allowing it to drop into a receptacle or onto a removal belt below.

Timer circuit 56 is preferably adjustable to control the length of time that the automatic reverse rotation of the head will continue. The desired length of time for reverse rotation is dependent on the speed of the motor and the diameter of the head. The time is selected so that the largest leaf lard removed will be completely unwound from the head. Typically this will be less than five seconds, and preferably less than one second in a high speed hog processing operation. At the end of this period of time, driver circuit 58 allows the hydraulic valve 36 to change to the off position, cutting off hydraulic pressure from line 42 and stopping rotation of the driver 12 as well as head 14.

In the preferred embodiment, the driver 12 is a hydraulic motor with the described three position hydraulic valve 36 being used to control the described forward and reverse rotation. However, alternative designs are also suitable. For example, the driver 12 may use an electric motor, instead of a hydraulic motor, and the driver circuitry 58 may be used to directly drive the electric motor in the forward and reverse directions. Other designs including pneumatic operation and the like are also feasible.

By balancing the tool at suspension point 18, and by positioning the front handle 24 in front of the balance point and the rear handle 26 behind the balance point, the operator is provided with good control in order to position the head 14 as desired relative to the lard to be removed.

A shield 70, provided with a flap guard 72 and having a window 74, is used to protect the operator from any loose material which may be flung off the head as it rotates. A forwardly curved fence 76 provides additional protection.

Figure 2:
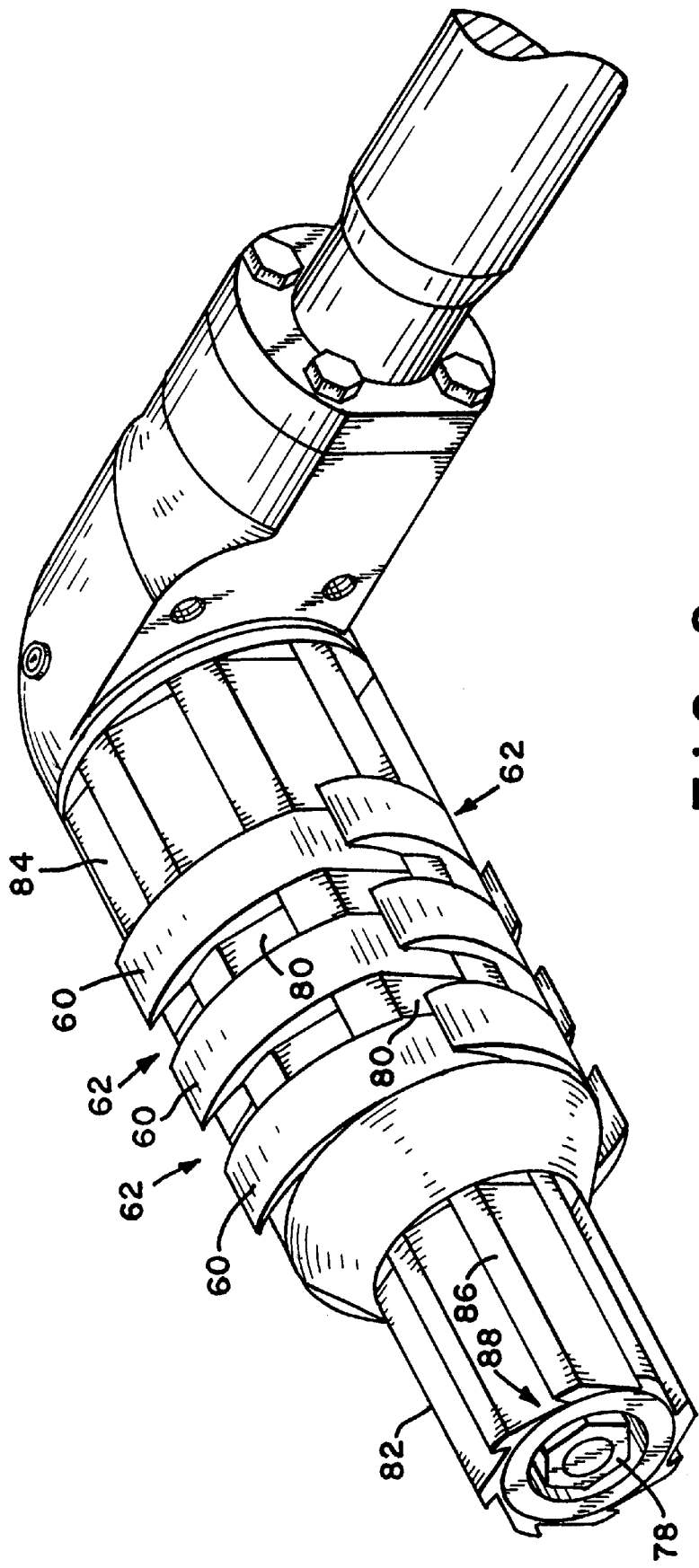
FIG. 2 is a detailed perspective view of the head end of the leaf lard remover tool of the present invention.
Figure 3:
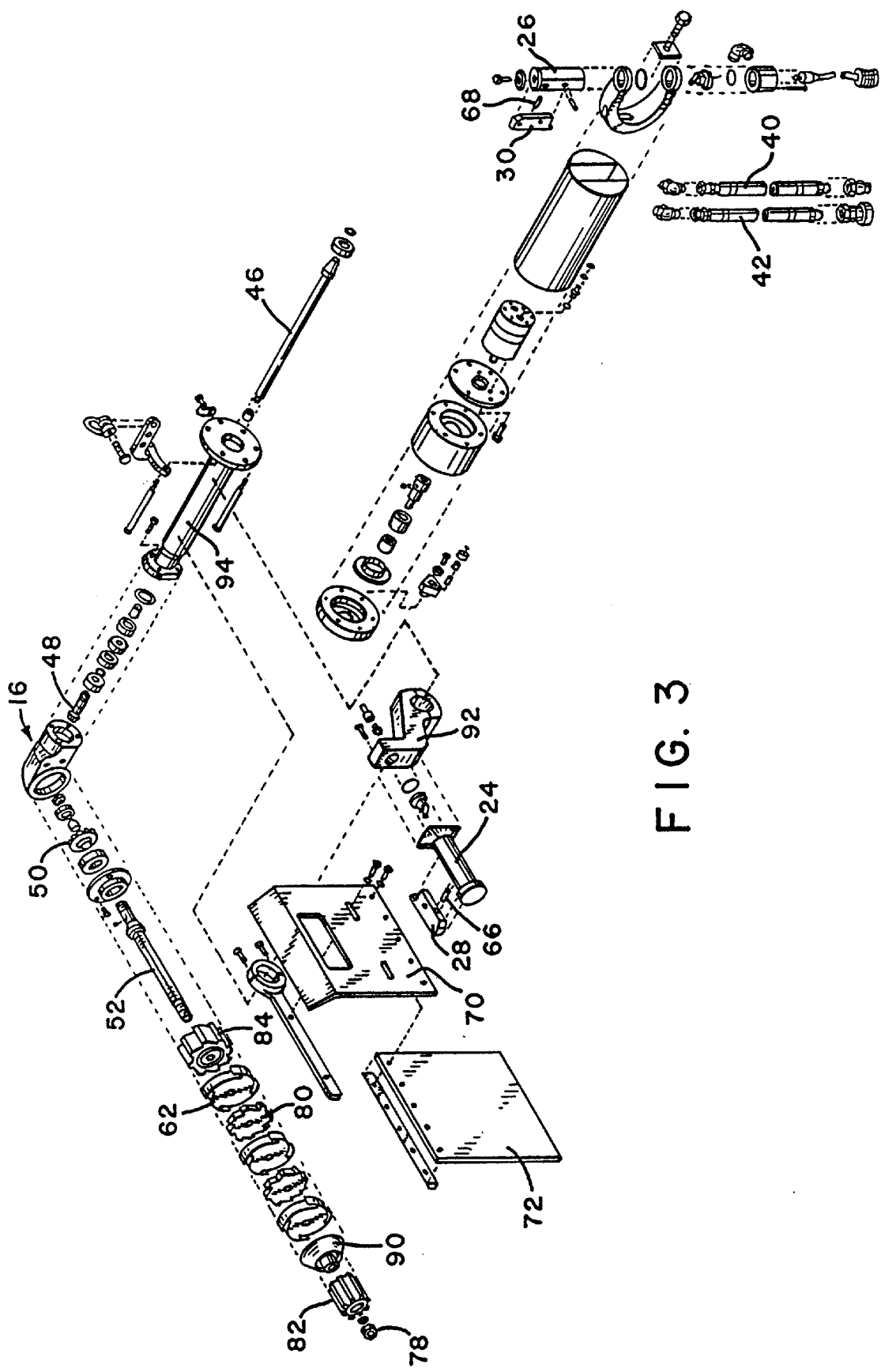
FIG. 3 is an exploded view, in perspective, showing the leaf lard remover tool of the present invention.

Referring to FIGS. 2 and 3, it can be seen that the head includes three hook disks 62, each of which is provided with four hooks 60 spaced equally about the circumference of the disk. The disks are provided with a square hole which is captured on square shaft 52. The disks are held onto the square shaft by a capture nut 78 and are spaced apart by spacers 80.

On one side of the hook disks is a tip portion 82 and on the other side of the hook disks is an inner portion 84. The inner portion, spacers and the tip portion are all provided with a notched surface composed of ridges 86 and notches 88. The ridges and notches generally provide a non-slip surface which adheres to the leaf lard when the head 14 is rotated in the forward direction. This surface is less aggressive in making connection than the hooks 60 on the hook disks 62. This ensures that the rotating head will not damage adjacent portions of meat in the carcass which might be damaged by the more aggressive hooks in the central portion of the head 14. The forward angle of the notches 88 aids in releasing the lard when the head 14 is operated in the reverse direction.

As may be seen in FIG. 3, the head is assembled by sliding the base portion 84 and the hook disks 62, separated by spacers 80, onto the square shaft 52 followed by transition spacer 90 and the tip portion 82. Nut 78 is used to retain the assembly on the end of the square shaft 52.

It will be noted that the tip portion 82 has a smaller diameter than the hook disks or the remaining portions of the head. This allows the operator to use the tool adjacent to the backbone and to other portions of the carcass without damaging those portions of meat. With the construction of the invention shown in the drawings, the tool is used for removal of the lard on only one side of the carcass such that the smaller end of the head 14 is near the backbone.

To remove the lard from the opposite side of the carcass, a second tool is used, with the head 14 and the right angle gear drive 16 attached to the tool in a 180° reversed orientation. With this arrangement, the shield 70 and the flap 72 are mounted on the opposite side of casing 94 and the hook disks 62 are reversed on square shaft 52

Handle 24, is attached to bracket 92 which is attached to shaft casing 94 connected between the body 10 and the right angle gear mechanism 16. The various rotating elements of the tool are conventionally provided with bearings, seals and housings as illustrated in FIG. 3.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A leaf lard remover tool comprising:
    a head adapted to engage lard;
    a reversible driver for rotating the head in a forward direction and in a reverse direction;
    a trigger connected to operate the reversible driver and begin rotation of the head in the forward direction to wind lard onto the head; and
    a controller connected to the trigger, the controller automatically reversing the driver and rotating the head in the reverse direction to unwind lard from the head after the trigger is released.

2. The leaf lard remover tool of claim 1 wherein the trigger provides a control signal to the controller and the controller operates the reversible driver to rotate the head in the forward direction when the trigger is actuated and to rotate the head in the reverse direction after the trigger is released.

3. The leaf lard remover tool of claim 2 wherein:
    the trigger is biased towards an off position and must be held by an operator in an on position;
    the controller continuously rotates the head in the forward direction while the trigger is held in the on position; and
    the controller automatically reverses the driver and rotates the head in the reverse direction for a fixed period of time after the trigger is released.

4. The leaf lard remover tool of claim 3 wherein:
    the leaf lard remover tool includes a second trigger;
    the second trigger is biased towards an off position and must be held by an operator in an on position; and
    the controller is connected to the second trigger and controls the driver to rotate the head in the forward direction only when both triggers are held in the on position, and the controller automatically reverses the driver and rotates the head in the reverse direction for a fixed period of time after either trigger is released.

5. The leaf lard remover tool of claim 1 wherein the reversible driver includes a hydraulically operated reversible motor.

6. The leaf lard remover tool of claim 5 wherein:
    the hydraulically operated reversible motor includes first and second hydraulic lines for receiving and exhausting hydraulic fluid;
    the controller includes a steering valve connected to the first and second hydraulic lines and to a source of pressurized hydraulic fluid; and
    the controller controls the steering valve to send pressurized hydraulic fluid to the reversible driver through the first hydraulic line to operate the motor in the forward direction and to send pressurized hydraulic fluid to the reversible driver through the second hydraulic line to operate the motor in the reverse direction.

7. The leaf lard remover tool of claim 1 wherein the controller automatically reverses the driver and rotates the head in the reverse direction for a fixed period of time after the trigger is released.

8. The leaf lard remover tool of claim 7 wherein the fixed period of time is less than 5 seconds.

9. The leaf lard remover tool of claim 8 wherein the fixed period of time is less than about 1 second.

10. The leaf lard remover tool of claim 1 wherein:
   the leaf lard remover tool further includes first and second handles and a second trigger;
   the first trigger is mounted in the first handle and the second trigger is mounted in the second handle;
   the first and second triggers are spring biased towards an off position and positioned on the handles such that an operator must have his hands on the triggers and away from the head to actuate the triggers; and
   the controller is connected to the first and second triggers and controls the driver to rotate the head in the forward direction only when both triggers are held in the on position.

11. The leaf lard remover tool of claim 1 further including a right angle gear system connected between the reversible driver and the head.

12. The leaf lard remover tool of claim 1 wherein the head includes a plurality of hooks, the hooks engaging lard when placed adjacent to lard while the head is rotating in the forward direction and the hooks releasing the lard when the head is rotated in the reverse direction.

13. The leaf lard remover tool of claim 12 wherein the head comprises a plurality of disks, each disk including one or more of the hooks.

14. The leaf lard remover tool of claim 13 wherein the head comprises at least three disks, each disk including at least two hooks.

15. The leaf lard remover tool of claim 13 wherein the disks are separated by spacers without hooks.

16. The leaf lard remover tool of claim 12 wherein the hooks extend over a limited portion of the head.

17. The leaf lard remover tool of claim 16 wherein the head comprises a tip portion including none of the hooks and a central portion including the plurality of hooks.

18. The leaf lard remover tool of claim 17 wherein the tip portion of the head has a smaller diameter than the central portion of the head.

19. The leaf lard remover tool of claim 17 wherein the tip portion of the head is provided with a notched surface.

20. A leaf lard remover tool comprising:
   a body;
   a pair of handles mounted to the body, the handles allowing the tool to be held away from a tool operator;
   a reversible driver mounted in the body;
   a head having a plurality of hooks adapted to engage lard, the head being connected to the reversible driver and oriented for motion in a plane in front of the tool operator, the reversible driver rotating the head in a forward direction and in
   a reverse direction;
   at least one trigger mounted in close proximity to one of the handles, the trigger being actuatable by movement towards an on position and being spring biased towards an off position; and
   a controller connected to the trigger and to the driver, the controller operating the driver to begin rotating the head in the forward direction to wind lard onto the head when the trigger is actuated and the controller automatically reversing the driver and rotating the head in the reverse direction for a predetermined length of time to unwind lard from the head after the trigger is released.

* * * * *

UNITED STATES PATENT AND TRADEMARK OFFICE
CERTIFICATE OF CORRECTION

PATENT NO. : 5,997,394
DATED : December 7, 1999
INVENTOR(S) : Loseke

It is certified that error appears in the above-identified patent and that said Letters Patent is hereby corrected as shown below:

In the Abstract

In the last line, delete "an".

In the Claims

In claim 14, column 7, line 34, insert - - of the - - after "two".

Signed and Sealed this

Eighteenth Day of July, 2000

Attest:

Q. TODD DICKINSON

*Attesting Officer*        *Director of Patents and Trademarks*